US012756888B2

(12) United States Patent
Zhou et al.

(10) Patent No.: US 12,756,888 B2
(45) Date of Patent: Oct. 6, 2026

(54) SHORT VIDEO PLAYBACK METHOD AND APPARATUS, AND ELECTRONIC DEVICE

(71) Applicant: Beijing Zitiao Network Technology Co., Ltd., Beijing (CN)

(72) Inventors: Yuwei Zhou, Beijing (CN); Liyue Ji, Beijing (CN); Xinkai Zhou, Beijing (CN); Peipei Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/730,225

(22) PCT Filed: Feb. 20, 2023

(86) PCT No.: PCT/CN2023/077211
§ 371 (c)(1),
(2) Date: Jul. 18, 2024

(87) PCT Pub. No.: WO2023/165363
PCT Pub. Date: Sep. 7, 2023

(65) Prior Publication Data

US 2025/0106466 A1 Mar. 27, 2025

(30) Foreign Application Priority Data

Mar. 2, 2022 (CN) ......................... 202210198946.8

(51) Int. Cl.
*H04N 21/431* (2011.01)
*G06T 19/00* (2011.01)

(52) U.S. Cl.
CPC ....... *H04N 21/4312* (2013.01); *G06T 19/006* (2013.01)

(58) Field of Classification Search
CPC ......... H04N 21/4312; H04N 21/41407; H04N 21/4316; H04N 21/816; G06T 19/006;
(Continued)

(56) References Cited

U.S. PATENT DOCUMENTS 9,245,388 B2 * 1/2016 Poulos .................... G06F 3/011
9,367,203 B1 * 6/2016 Costello ............. G06F 3/04815
(Continued)

FOREIGN PATENT DOCUMENTS

CN 105404441 A 3/2016
CN 106375833 A 2/2017
(Continued)

OTHER PUBLICATIONS

CN113709542A English Translation (Year: 2021).*
(Continued)

*Primary Examiner* — Fernando Alcon

(57) ABSTRACT

The present disclosure relates to a short video playback method and apparatus, and an electronic device, and relates to the technical field of short videos. The method comprises: entering an extended reality space, and obtaining a user's instruction to open a first short video; first obtaining first video element data of the first short video, wherein the first video element data includes: a playback area element and an interactive area element of the first short video; and then displaying the playback area element and the interactive area element at different area positions of the extended reality space.

20 Claims, 7 Drawing Sheets

(58) Field of Classification Search

CPC ........... G09G 2340/10; G09G 2340/12; G09G 2340/125; G06F 3/04815; G06F 3/0482; G06F 3/04842; G06F 3/0485; G06F 3/14; G06F 3/04845

See application file for complete search history.

(56) References Cited

U.S. PATENT DOCUMENTS

| | | | | |
|---|---|---|---|---|
| 10,242,400 | B1 * | 3/2019 | Eraker | G06Q 30/0643 |
| 10,250,953 | B1 * | 4/2019 | Murali | H04N 21/4312 |
| 10,854,014 | B2 * | 12/2020 | Rao | G06F 3/011 |
| 10,866,719 | B1 * | 12/2020 | Bulusu | H04L 51/52 |
| 11,184,647 | B1 | 11/2021 | Khalid et al. | |
| 11,328,484 | B2 * | 5/2022 | Powderly | G02B 27/017 |
| 2011/0279445 | A1 * | 11/2011 | Murphy | G06F 3/04842 715/764 |
| 2011/0279453 | A1 * | 11/2011 | Murphy | H04L 67/52 345/420 |
| 2012/0086727 | A1 * | 4/2012 | Korah | G06F 3/03 345/633 |
| 2012/0327117 | A1 * | 12/2012 | Weller | G06T 19/006 345/633 |
| 2013/0050414 | A1 * | 2/2013 | Siniavine | G06F 3/04815 348/E13.001 |
| 2014/0002444 | A1 | 1/2014 | Bennett et al. | |
| 2014/0053099 | A1 * | 2/2014 | Groten | G01C 21/3647 715/790 |
| 2014/0300775 | A1 * | 10/2014 | Fan | H04N 1/32128 348/222.1 |
| 2016/0071314 | A1 | 3/2016 | Nordstoga et al. | |
| 2016/0180512 | A1 | 6/2016 | Myers et al. | |
| 2016/0357221 | A1 * | 12/2016 | Huh | G06F 3/04845 |
| 2016/0370970 | A1 * | 12/2016 | Chu | G06F 3/011 |
| 2018/0189958 | A1 * | 7/2018 | Budagavi | H04N 21/84 |
| 2018/0286126 | A1 * | 10/2018 | Schwarz | G06F 3/04845 |
| 2018/0316947 | A1 | 11/2018 | Todd | |
| 2019/0012844 | A1 * | 1/2019 | Rao | H04N 21/8583 |
| 2020/0134780 | A1 * | 4/2020 | Chapiro | G06F 3/013 |
| 2020/0245017 | A1 | 7/2020 | Ganschow et al. | |
| 2021/0092489 | A1 * | 3/2021 | Dutta | H04N 21/4728 |
| 2022/0092862 | A1 * | 3/2022 | Faulkner | G06F 3/011 |
| 2022/0155940 | A1 * | 5/2022 | Olbrich | G06Q 30/0631 |
| 2022/0197449 | A1 * | 6/2022 | Ding | G06F 3/0482 |
| 2023/0359337 | A1 | 11/2023 | Gao et al. | |
| 2024/0119682 | A1 * | 4/2024 | Rudman | G06T 19/006 |
| 2025/0022212 | A1 * | 1/2025 | Brandt | H04N 21/6437 |
| 2025/0238110 | A1 * | 7/2025 | Murley | G06F 3/0481 |
| 2025/0264973 | A1 * | 8/2025 | Murley | G06F 3/017 |

FOREIGN PATENT DOCUMENTS

| | | | | |
|---|---|---|---|---|
| CN | 109120981 | A | 1/2019 | |
| CN | 111652678 | A | 9/2020 | |
| CN | 112148744 | A | 12/2020 | |
| CN | 112181572 | A | 1/2021 | |
| CN | 112764612 | A | 5/2021 | |
| CN | 113115096 | A | 7/2021 | |
| CN | 113709542 | A | 11/2021 | |
| CN | 113747227 | A | 12/2021 | |
| CN | 113905265 | A | 1/2022 | |
| CN | 114040231 | A | 2/2022 | |
| WO | WO-2018140645 | A1 * | 8/2018 | G06F 3/0488 |
| WO | 2019/052451 | A1 | 3/2019 | |
| WO | 2021/206408 | A1 | 10/2021 | |

OTHER PUBLICATIONS

International Search Report and Written Opinion received for PCT Patent Application No. PCT/CN2023/077211, mailed on May 4, 2023, 12 pages (6 pages of English Translation and 6 pages of Original Document).

EP Extended Search Report issued in EP Appl. No. 23762764.1 dated Sep. 3, 2025 (9 pages).

Office action received for Chinese patent application No. 202210198946.8 mailed on Mar. 24, 2026, 22 pages (11 pages English Translation and 11 pages Original document).

* cited by examiner

SHORT VIDEO PLAYBACK METHOD AND APPARATUS, AND ELECTRONIC DEVICE

CROSS-REFERENCE TO RELATED APPLICATIONS

The present application is a U.S. National Stage application under 35 U.S.C. § 371 of International Application No. PCT/CN2023/077211, as filed on Feb. 20, 2023, which claims priority to the Chinese Patent Application No. 202210198946.8 filed on Mar. 2, 2022, titled "Short Video Playback Method and Apparatus, And Electronic Device", the disclosure of which is incorporated by reference herein in its entirety.

TECHNICAL FIELD

The present disclosure relates to the technical field of short videos, and in particular to a short video playback method and apparatus, and an electronic device.

BACKGROUND

With the rapid development of the Internet, short video social software is becoming more and more popular. Short videos refer to video content played on various new media platforms, suitable for being watched in mobile and short leisure states, and pushed at a high frequency, ranging from a few seconds to a few minutes. The content thereof integrates topics such as skill sharing, humor, fashion trends, social hotspots, street interviews, public welfare education, advertising creativity, and commercial customization. As the content is short, it can be a stand-alone film or a series of columns.

SUMMARY

In view of this, the present disclosure provides a short video playback method and apparatus, and an electronic device.

In a first aspect, the present disclosure provides a short video playback method, which is applied to an extended reality (XR) device end, comprising:

- entering an extended reality space, and obtaining a user's instruction to open a first short video;
- obtaining first video element data of the first short video, wherein the first video element data includes: a playback area element and an interactive area element of the first short video;
- displaying the playback area element and the interactive area element at different area positions of the extended reality space.

In a second aspect, the present disclosure provides a short video playback apparatus, which is applied to an extended reality device end, comprising:

- an obtaining module, configured to enter an extended reality space and obtain a user's instruction to open a first short video;
- the obtaining module being further configured to obtain first video element data of the first short video, wherein the first video element data includes: a playback area element and an interactive area element of the first short video;
- a playback module, configured to display the playback area element and the interactive area element at different area positions of the extended reality space.

In a third aspect, the present disclosure provides a computer-readable storage medium having computer program stored thereon, wherein the computer program, when executed by a processor, implements the short video playback method in the first aspect.

In a fourth aspect, the present disclosure provides an electronic device, comprising a storage medium, a processor, and a computer program stored on the storage medium and executable on the processor, wherein the processor, when executing the computer program, implements the short video playback method in the first aspect.

The above description is only an overview of the technical solution of the present disclosure. In order to more clearly understand the technical means of the present disclosure, it can be implemented according to the contents of the specification. In order to make the above and other purposes, features and advantages of the present disclosure more obvious and easy to understand, the specific implementation modes of the present disclosure are described below.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

In order to more clearly illustrate the embodiments of the present disclosure or the technical solutions in the related art, the drawings required for use in the embodiments or the description of the related art will be briefly introduced below. Obviously, for those skilled in the art, other drawings can be obtained based on these drawings without paying any creative labor.

DETAILED DESCRIPTION

Embodiments of the present disclosure will be described in more detail below with reference to the accompanying drawings. It should be noted that, in the absence of conflict, the embodiments and features in the embodiments of the present disclosure may be combined with each other.

At present, the short video playback methods are all based on a certain plane space and a unified interactive logic. There are only two dimensions, X and Y axes, between page elements, which cannot provide an immersive sense of space, and thus cannot provide users with a better watching experience.

The present disclosure aims at solving the technical problem that the current traditional short video playback method cannot provide an immersive sense of space and thus cannot provide users with a better watching experience. A short video playback method and apparatus, and an electronic device provided by the present disclosure, compared with the current traditional short video playback method, can utilize the existing capabilities of the extended reality device to make a spatial scheme for watching short videos and related interactions in three dimensions of X, Y, and Z axes, thereby bringing a unique user experience to users. Specifically, entering an extended reality space at the extended reality device end; in response to a user's instruction to open a short video, first obtaining video element data of the short video, wherein the video element data may include: a playback area element and an interactive area element of the short video; then displaying the playback area element and the interactive area element at different area positions of the extended reality space, so as to achieve the effect of playing the short video. By applying the technical solution provided by the present disclosure, an immersive sense of space can be provided for users when watching short videos, thereby providing the users with a better watching experience.

Figure 1:
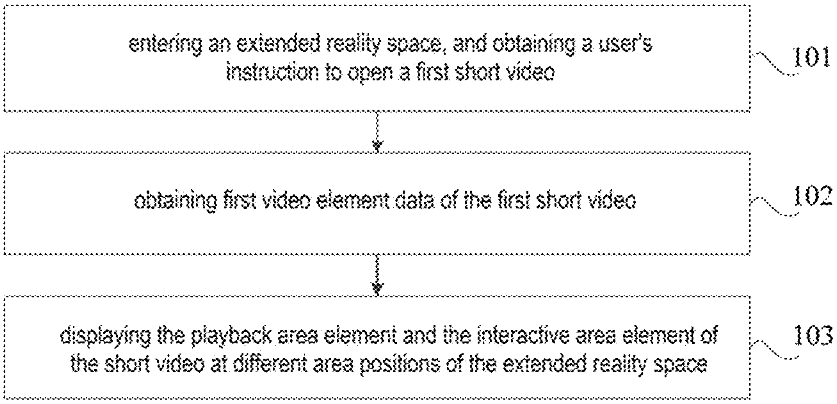
FIG. 1 is a schematic diagram showing a flow chart of a short video playback method provided by an embodiment of the present disclosure.

The embodiment provides a short video playback method, as shown in FIG. 1, which can be applied to an extended reality device end, the method comprising:

Step 101: entering an extended reality space, and obtaining a user's instruction to open a first short video.

Extended reality technology refers to a real and virtual combined human-computer interactive environment generated through computer technology and wearable devices. Extended reality may specifically include: Augmented Reality (AR), Virtual Reality (VR), Mixed Reality (MR), etc. Taking the example where an extended reality space is a virtual reality space, after entering the virtual reality space using the virtual reality device, the user may input an instruction to open a short video through focus positioning, handle rays, or the like, and the virtual reality device end may obtain the instruction and execute the process shown in steps 102 to 103 according to the instruction.

Step 102: obtaining first video element data of the first short video, wherein the first video element data includes: a playback area element and an interactive area element of the first short video. The first short video may be one of a plurality of short videos. The video element data of each short video can be downloaded from the server end.

In this embodiment, the short video may be split into a plurality of elements, such as a playback area and an interactive area. The playback area may further include elements such as video (it may support video pause function, and the video part may be compatible with multiple video sizes, such as 16:9, 16:10, 4:3, 1:1, etc.), user name, video title, background music information, etc., while the interactive area may further include elements such as video author avatar, like button, number of likes, comment button, comment number information, other function key buttons, etc.

For this embodiment, in order to present a three-dimensional stereoscopic display effect, different elements in the video element data may all set in advance their respective corresponding area positions in the extended reality space, such as spatial positions including three dimensions of X, Y, and Z axes. For example, in the three-dimensional space of extended reality, there exists a spatial relationship on the Z axis (i.e., far or near), and there is a front-and-back relationship between different elements in the space on the Z axis (relatively, the X axis and Y axis may represent a plane direction), that is, elements are set in parallel at different positions on the Z axis, so that a three-dimensional effect can be presented in the Z-axis direction.

Step 103: displaying the playback area element and the interactive area element of the short video at different area positions of the extended reality space.

Optionally, the different area positions of the extended reality space in step 103 may specifically include: non-overlapping areas of the same plane of the extended reality space, or different planes of the extended reality space, or the like.

For example, a plurality of elements of a short video such as the playback area element and the interactive area element are placed at their corresponding area positions in the extended reality space for display, presenting a three-dimensional spatial display effect. Compared with the current traditional short video playback method, this embodiment can utilize the existing capabilities of the extended reality device to make a spatial scheme for watching short videos and related interactions in three dimensions of X, Y, and Z axes, which can bring users a unique watching experience that is completely different from watching short videos at the traditional mobile phone end.

In this embodiment, video element data of a short video is first obtained at the extended reality device end, and the video element data may include: a playback area element and an interactive area element of the short video; then the playback area element and the interactive area element are displayed at different area positions of the extended reality space, thereby achieving the effect of playing the short video. By applying the technical solution provided in this embodiment, an immersive sense of space can be provided for users when watching short videos, thereby providing users with a better watching experience.

Figure 2:
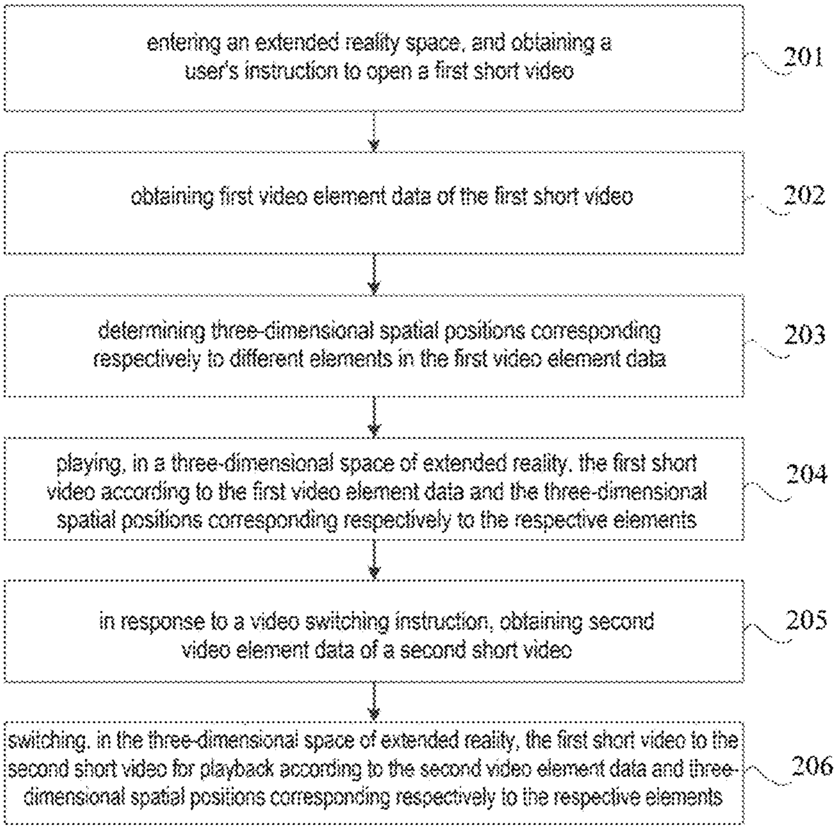
FIG. 2 is a schematic diagram showing a flow chart of another short video playback method provided by an embodiment of the present disclosure.

Further, as a refinement and extension of the above embodiment, in order to fully illustrate the specific implementation process of the method of this embodiment, this embodiment provides a specific method as shown in FIG. 2, which comprises:

Step 201: entering an extended reality space and obtaining a user's instruction to open a first short video.

Step 202: obtaining first video element data of the first short video.

In this embodiment, the process of splitting a short video into a plurality of elements can be implemented at the server end. For example, the content of the short video is redeveloped and split into various components, and playback elements are created based on the components, and further, from these elements, the video element data of the short video can be obtained.

The extended reality device end may download the video element data of the short video from the server end, and in order to reduce the impact of network bandwidth on the downloaded data, optionally, the video element data of the short video may be downloaded to the local in advance where there is good network bandwidth. In this way, the video element data can be obtained from the local in time when the video needs to be played, so as to achieve a quick response to video playback and reduce the influence on the user's watching of the video.

Step 203: determining three-dimensional spatial positions corresponding respectively to different elements in the first video element data.

In this embodiment, for the three-dimensional spatial positions corresponding to the different elements in the video element data, a corresponding mapping relationship may be configured in advance, and then the three-dimensional spatial positions corresponding to the different elements may be determined according to the mapping relationship before playback. Alternatively, the priority of the different elements may be configured in advance, and then on the virtual device side, the three-dimensional spatial positions corresponding to the different elements are configured according to the priority, so that elements with higher priority can be closer in the Z-axis direction; elements with lower priority can be farther away in the Z-axis direction, so as to prominently display the elements with higher priority. For example, some elements with strong interactive functions may be set with higher priority, such as elements that a user may click to further view; alternatively, elements that the user frequently clicks to view (determined based on the user's historical operating behavior) may be set with higher or highest priority, or the like.

Step 204: playing, in a three-dimensional space of extended reality, the first short video according to the first video element data and the three-dimensional spatial positions corresponding respectively to the respective elements.

Figure 3:
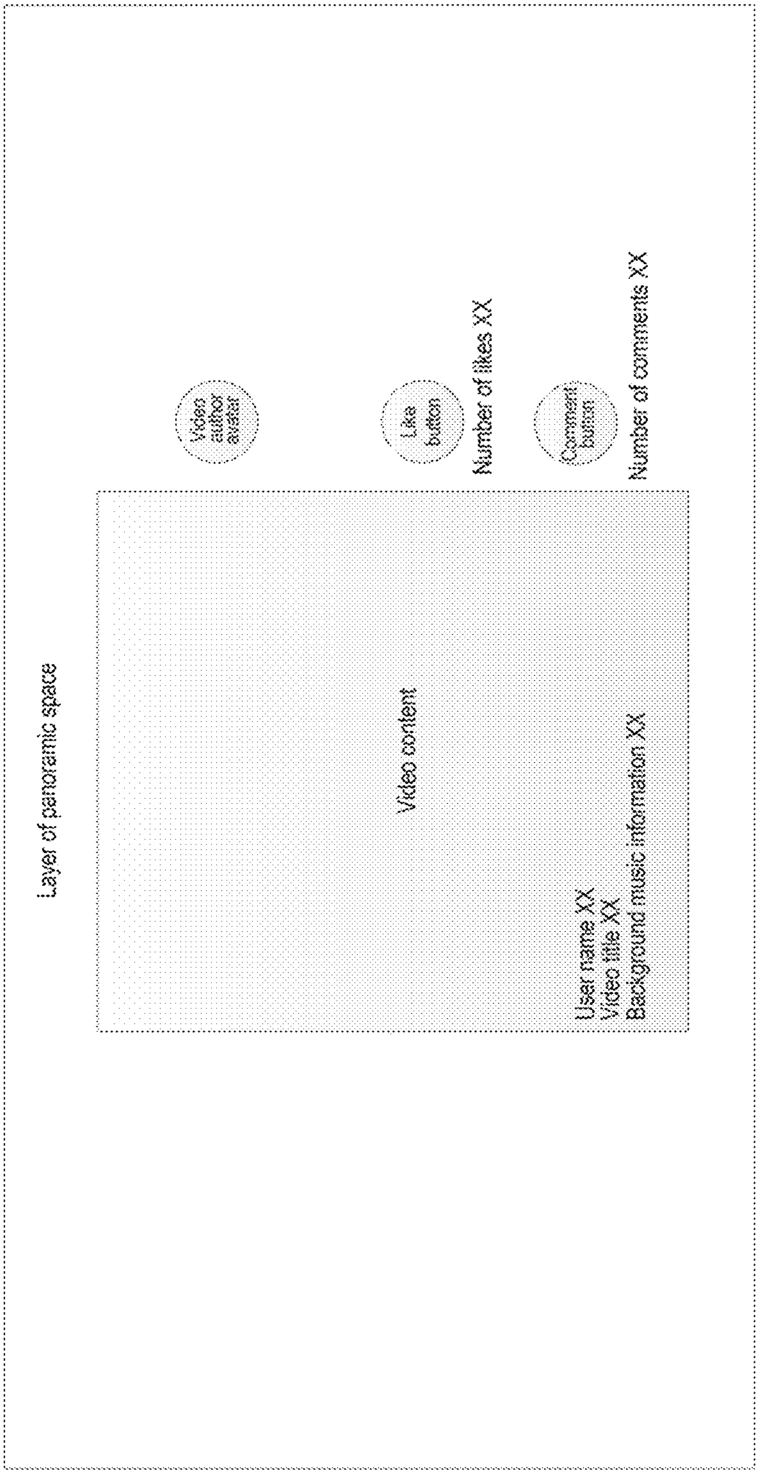
FIG. 3 is a schematic diagram showing an example of a short video display effect based on extended reality technology provided by an embodiment of the present disclosure.
Figure 4:
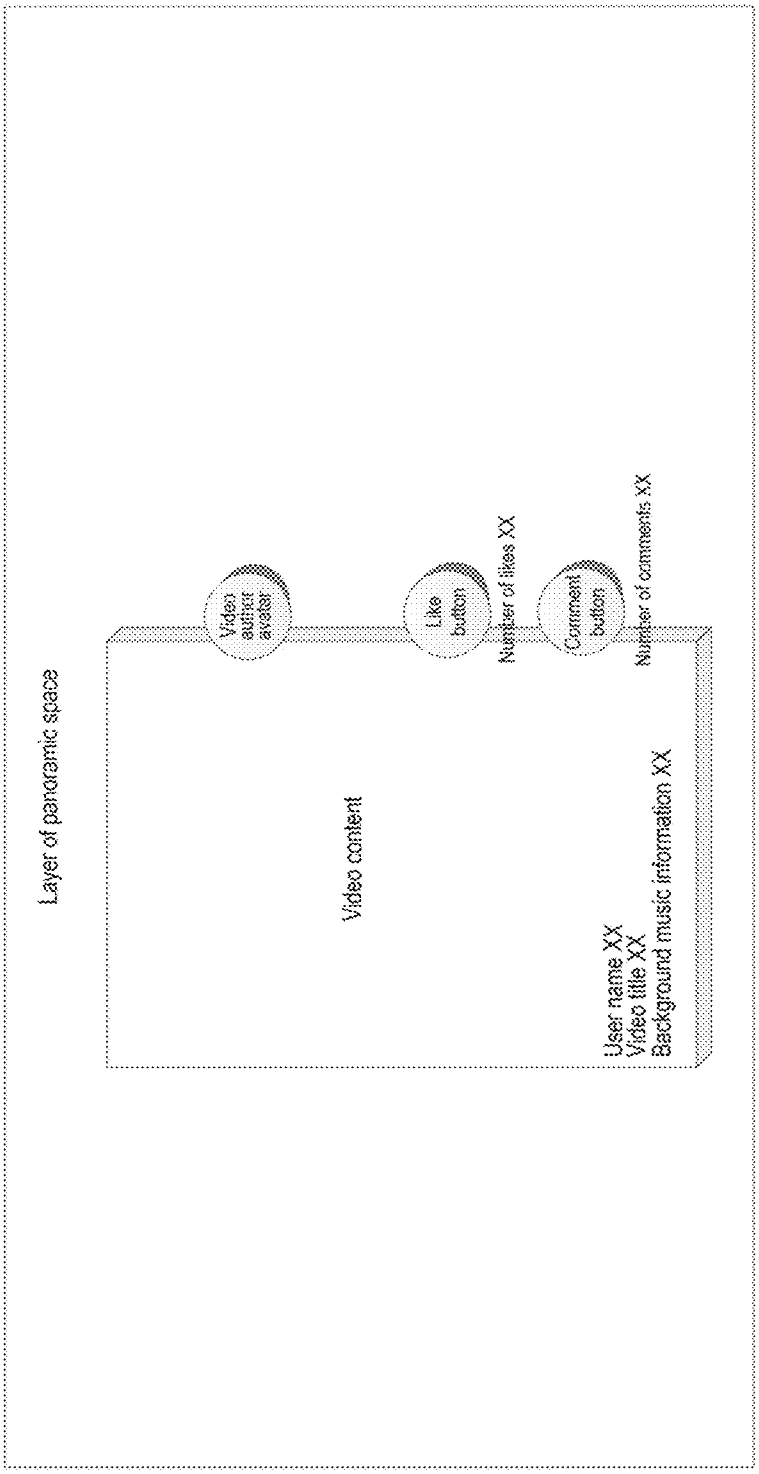
FIG. 4 is a schematic diagram showing a stereoscopic effect of a short video display example provided by an embodiment of the present disclosure.

Exemplarily, step 204 may specifically comprise: configuring the respective elements in the first video element data at their corresponding three-dimensional spatial positions respectively to play the first short video. For example, a plurality of elements of a short video, such as the video content, a video author avatar, a like button, the number of likes, a comment button, comment number information of the short video, etc., are placed at their respective corresponding three-dimensional spatial positions for playback, presenting a three-dimensional spatial display effect. Compared with the current traditional short video playback method, this embodiment can utilize the existing capabilities of the extended reality device to make a spatial scheme for watching short videos and related interactions in three dimensions of X, Y, and Z axes, which can bring users a unique watching experience that is completely different from watching short videos at the traditional mobile phone end. The displayed front view effect may be as shown in FIG. 3, and the displayed stereoscopic view effect may be as shown in FIG. 4. For example, if it is based on virtual reality technology, the panoramic space in the figures may be a simulated three-dimensional environment; and if it is based on augmented reality technology, the panoramic space in the figures may be a real three-dimensional environment, or the like.

For this embodiment, some elements may be further displayed through user interaction operations, so as to meet the user's additional needs for short video watching. Here are some application examples (A, B, C):

Example A: taking a video author avatar element included in the interactive area element, and a user name element included in the playback area element as an example, after step 204, the method of this embodiment may further comprise: in response to a select instruction of the video author avatar element or the user name element, first obtaining video author page data of the first short video; then determining three-dimensional spatial positions of page elements corresponding to the video author page data; and after that, displaying, in the three-dimensional space of extended reality, the video author page of the first short video according to the video author page data and the three-dimensional spatial positions of the corresponding page elements.

For example, when a short video is played in the three-dimensional space of extended reality, the user clicks on the video author avatar element or user name element, and the extended reality device end may obtain the video author page data of the short video from the video element data or from the server end. The video author page data may specifically include elements such as personal homepage avatar, user name, personal signature, authentication information, account information, videos, number of likes of the videos, etc. Then the three-dimensional spatial positions of these elements in the three-dimensional space of extended reality are determined, and finally, in the three-dimensional space of extended reality, a video author page of the short video is displayed according to the video author page data and the three-dimensional spatial positions of the corresponding page elements.

For example, by clicking on a user avatar or user name on a homepage, the video author's personal homepage panel is opened, which may include personal homepage avatar, user name, personal signature, authentication information, account information, videos, number of likes of the videos, etc.

The displayed video author page may switch a short video to display, or be displayed together with the short video, etc. Correspondingly and optionally, displaying, in the three-dimensional space of extended reality, a video author page of the first short video according to the video author page data and the three-dimensional spatial positions of the corresponding page elements may specifically comprise: displaying the video author page of the first short video while playing the first short video.

Further optionally, the video author page data includes at least one video cover element, wherein the video cover elements can be displayed by scrolling switching, by adjusting their respective corresponding three-dimensional spatial positions.

Figure 5:
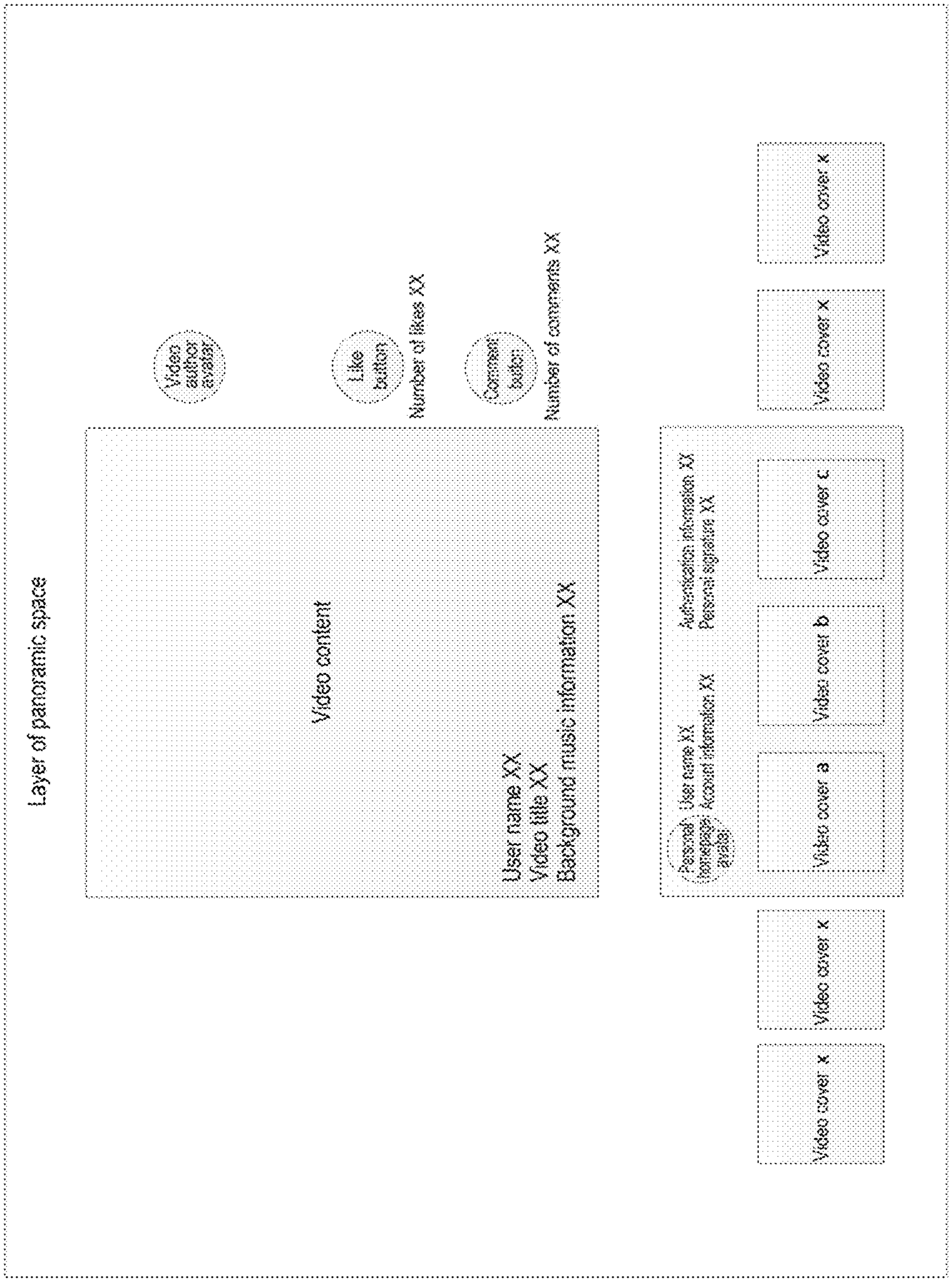
FIG. 5 is a schematic diagram showing a display effect of an example of a video author page provided by an embodiment of the present disclosure.

For example, as shown in FIG. 5, while a short video is being played, a video author page of the short video may be displayed, which includes a plurality of video covers corresponding to a plurality of videos produced by the author. These video covers support left-right scrolling switching, thereby switching to watch more videos of the author.

A video on the video author page may also be selected for watching. For example, a personal homepage video may be directly watched upon clicking on it. Correspondingly and optionally, after displaying, in the three-dimensional space of extended reality, a video author page of the first short video according to the video author page data and the three-dimensional spatial positions of the corresponding page elements, the method of this embodiment may further comprise: in response to a select-for-playback instruction of the video cover element, obtaining third video element data of a third short video (the short video on the video author page selected by the user for playback), wherein the third short video is a short video corresponding to the video cover element selected for playback, and the third video element data may include: a playback area element and an interactive area element of the third short video; then switching, in the three-dimensional space of extended reality, the first short video to the third short video for playback according to the third video element data and the three-dimensional spatial positions corresponding to the respective elements. The switching method may include: scrolling switching the first short video to the third short video; or overlaying the third short video on the third short video for display; or replacing the first short video with the third short video for display, etc.

Example B: Taking a comment button element included in the interactive area element as an example, after step 204, the method of this embodiment may further comprise: in response to a select instruction of the comment button element, first obtaining video comment page data of the first short video; then determining three-dimensional spatial positions of page elements corresponding to the video comment page data; after that, displaying, in the three-dimensional space of extended reality, a video comment page of the first short video according to the video comment page data and the three-dimensional spatial positions of the corresponding page elements.

For example, a user clicks a comment button to trigger a comment panel to expand, which may specifically include commenting user name, avatar, comment content, time, etc., and all comments may be presented in the form of vertical bubbles. The possible states included are a comment list, comments being empty, comments loaded, etc.

The displayed video comment page may switch the short video for playback, or be displayed together with the short video, etc. Correspondingly and optionally, displaying, in the three-dimensional space of extended reality, a video comment page of the first short video according to the video comment page data and the three-dimensional spatial positions of the corresponding page elements may specifically comprise: displaying the video comment page of the first short video while playing the first short video.

Further optionally, the video comment page data includes: at least one comment information element, wherein the comment information elements can be displayed by scrolling switching in a predetermined direction, by adjusting their respective corresponding three-dimensional spatial positions. For example, a comment list supports vertical scrolling, and more comments will be loaded when scrolling to the bottom.

Figure 6:
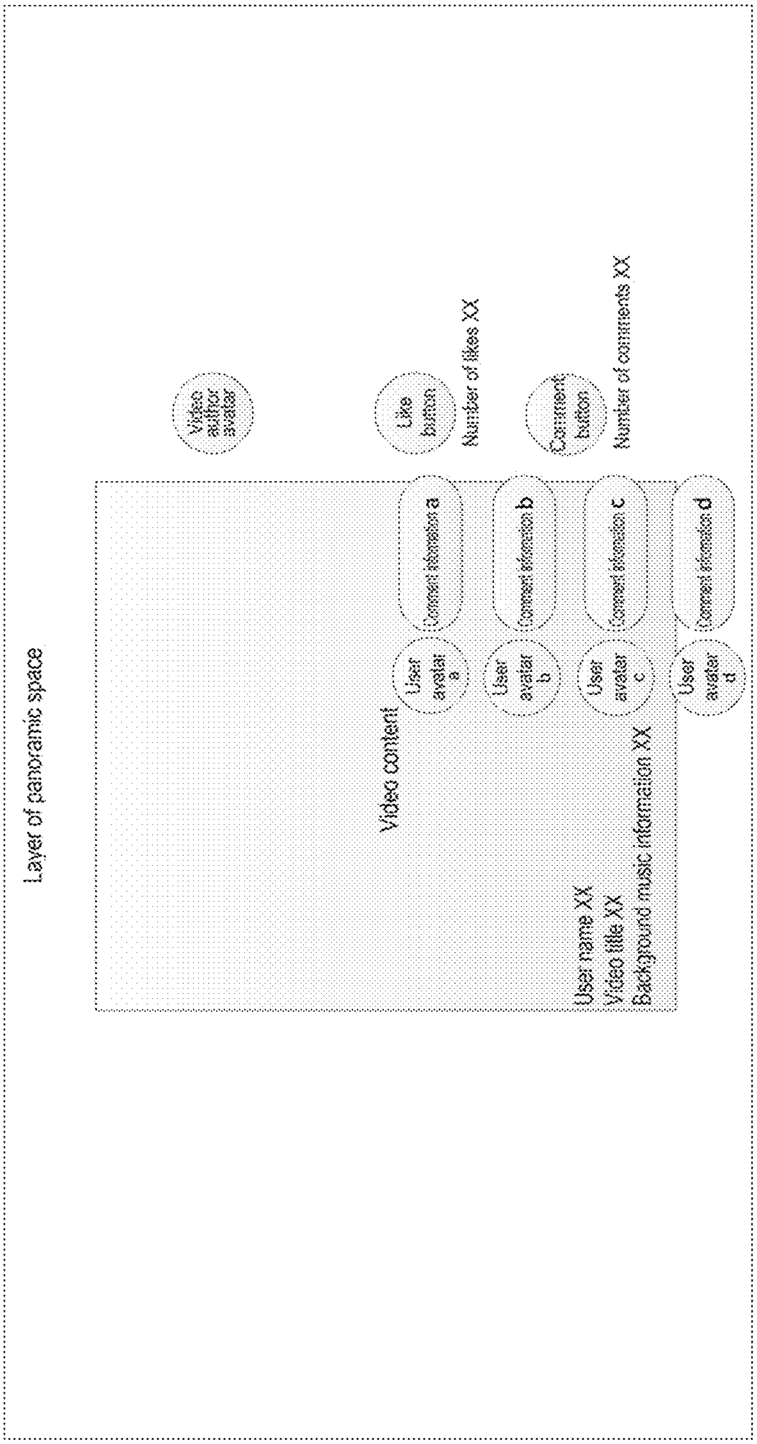
FIG. 6 is a schematic diagram showing a display effect of an example of a video comment page provided by an embodiment of the present disclosure.

For example, as shown in FIG. 6, a user clicks a comment button to trigger a comment panel to expand, and a comment list is displayed while a short video is being played. The comments in the comment list may be presented in the form of vertical bubbles, that is, the comments are displayed from bottom to top and then disappear. The comment list supports vertical scrolling, and more comments will be loaded when scrolling to the bottom, wherein the comment information may include a user name, comment content, time, etc.

Furthermore, the interactive area element may further include: a comment number element; if the user also participates in commenting on a short video, the number of comments may be updated in real time to enhance the user's use experience. Correspondingly, after displaying, in the three-dimensional space of extended reality, a video comment page of the first short video according to the video comment page data and the three-dimensional spatial positions of the corresponding page elements, the method of this embodiment may further comprise: in response to a comment submit instruction, obtaining the number of comments on the first short video; then by accumulating the number of comments, updating and displaying the comment number element. For example, the number of comments may be increased by 1, thus obtaining the updated number of comments.

Example C: taking a like button element and a like number element included in the interactive area element as an example, after step 204, the method of this embodiment may further comprise: in response to a select instruction of the like button element, obtaining the number of likes for the first short video; by accumulating the number of likes, updating and displaying the like number element, and changing a display status of the like button element. For example, when a user clicks a like button, the like button changes from white to red, the number of likes is increased by 1, and a preset animation effect may be provided, thus enhancing the user experience.

Further optionally, the like effect may be displayed together with the short video. Correspondingly, by accumulating the number of likes, updating and displaying the like number element may specifically comprise: while playing the first short video, updating and displaying the like number element, and changing the display status of the like button element.

Through the description of the above examples, the interactive area in the solution provided in this embodiment includes the video author avatar, the like button, the number of likes, the comment button, the comment number information, etc. In this way, by clicking on the avatar, the user may open the personal homepage panel; by clicking the like button, the like button turns red, the number of likes is increased by 1, and there is an animation effect; by clicking the comment button, the comment panel is opened, showing all comments on this video, etc., thereby meeting the users' additional demand for watching short videos and enhancing the user's interaction experience.

In addition to the above interactive operation examples, this embodiment may further realize fast switching between short videos to facilitate user watching. Specifically, the process shown in step 205 to step 206 may be executed.

Step 205: in response to a video switching instruction, obtaining second video element data of a second short video.

The second short video is different from the first short video in steps 201 to 204, and may be the previous or next video to the first short video. The second video element data of the second short video may include: a plurality of elements of the second short video such as a playback area and an interactive area. Similarly, the playback area of the second short video may include elements such as video (it may support video pause function, and the video part may be compatible with multiple video sizes, such as 16:9, 16:10, 4:3, 1:1, etc.), user name, video title, background music information, etc., while the interactive area may further include elements such as video author avatar, like button, number of likes, comment button, comment number information, etc.

The video switching instruction may be an instruction input by the user through an interactive operation, for example, inputting video switching instruction through the up and down keys on a joystick or by holding down a trigger key and dragging.

Step 206: switching, in the three-dimensional space of extended reality, the first short video to the second short video for playback according to the second video element data and three-dimensional spatial positions corresponding respectively to the respective elements.

For example, when watching short videos using the extended reality device, the user may switch to the previous or next video through the up and down keys on the joystick or by holding down the trigger key and dragging.

In order to accurately switch between short videos, optionally, step 206 may specifically comprise: by adjusting the three-dimensional spatial positions corresponding respectively to the elements in the second video element data (which may be part or all of the elements, which may be preset according to actual needs), dynamically moving the elements to target spatial positions, so as to realize the switching of the first short video to the second short video for playback in a preset form. Exemplarily, the preset form may include: scrolling switching, or overlaying display, or replacement display.

Figure 7:
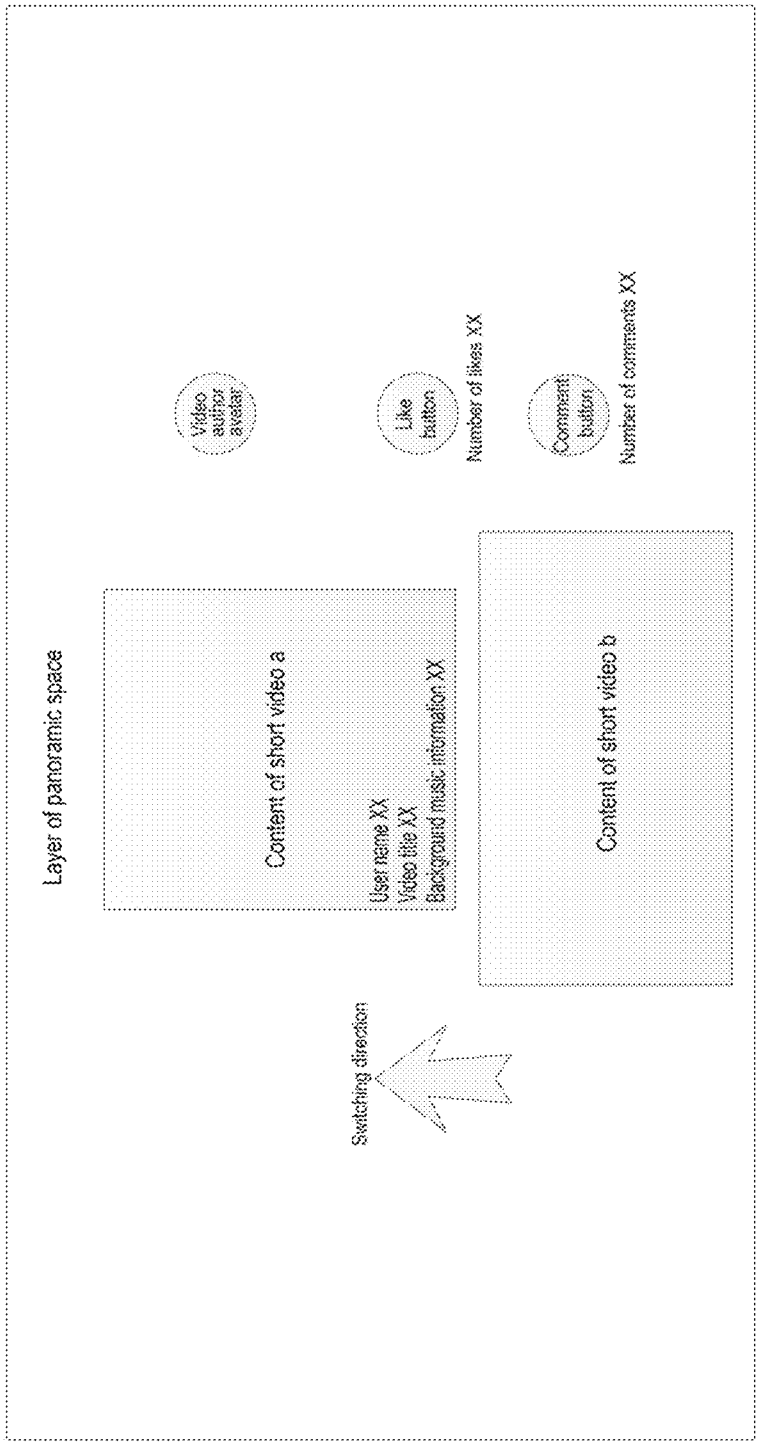
FIG. 7 is a schematic diagram showing a display effect of a video switching example provided by an embodiment of the present disclosure.

For example, taking an example of scrolling switching from short video a to short video b for playback, by adjusting the three-dimensional spatial positions corresponding respectively to the elements in the video element data of short video b, the elements are dynamically moved to target spatial positions (i.e., the three-dimensional spatial positions corresponding to the elements in the video element data of short video a when short video a is played), and meanwhile, by adjusting the three-dimensional spatial positions corresponding respectively to the elements in the video element data of short video a, the elements are dynamically moved, so that the elements leave the target spatial positions, thereby producing a scrolling switching effect. As shown in FIG. 7, in a direction from bottom to top, short video a is scrolling switched to short video b.

By applying the method of this embodiment, using the existing capabilities of the extended reality device, a spatial scheme for watching short videos and related interactions in three dimensions of X, Y, and Z axes is made, and a standard for how to place and interact with the elements in the VR space is established. The content and format of short video social software at the smartphone end may be displayed in the extended reality space. The entire space may be roughly divided into areas such as content, interaction, personal homepage panel, and comment panel. The content and interactive areas are compatible with different video sizes, providing a unified interaction experience. The content, personal homepage, and comment panel create, using the spatial relationship, a watching experience that is completely different from that at the mobile phone end, which can provide an immersive sense of space for the user when watching short videos, thereby providing the user with a better watching experience.

Figure 8:
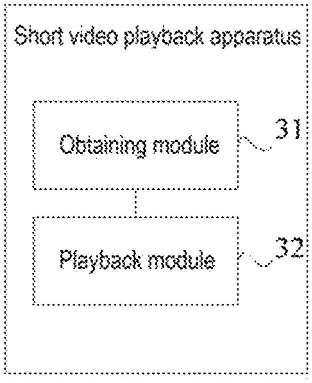
FIG. 8 is a schematic structural diagram showing a short video playback apparatus provided by an embodiment of the present disclosure.

Furthermore, as the specific implementation of the method shown in FIG. 1 and FIG. 2, this embodiment provides a short video playback apparatus which, as shown in FIG. 8, comprises: an obtaining module 31 and a playback module 32.

The obtaining module 31 is configured to enter an extended reality space and obtain a user's instruction to open a first short video.

The obtaining module is further configured to obtain first video element data of the first short video, wherein the first video element data includes: a playback area element and an interactive area element of the first short video.

The playback module 32 is configured to display the playback area element and the interactive area element at different area positions of the extended reality space.

In a specific application scenario, optionally, the different area positions include: non-overlapping areas of the same plane of the extended reality space, or different planes of the extended reality space.

In a specific application scenario, the playback module 32 is specifically configured to determine three-dimensional spatial positions corresponding respectively to different elements in the first video element data; play, in a three-dimensional space of extended reality, the first short video according to the first video element data and the three-dimensional spatial positions corresponding respectively to the respective elements.

In a specific application scenario, the playback module 32 is specifically configured to configure the respective elements in the first video element data at their corresponding three-dimensional spatial positions respectively to play the first short video.

In a specific application scenario, the obtaining module 31 is further configured to, after playing, in a three-dimensional space of extended reality, the first short video according to the first video element data and the three-dimensional spatial positions corresponding respectively to the respective elements, in response to a video switching instruction, obtain second video element data of a second short video, wherein the second video element data includes: a playback area element and an interactive area element of the second short video.

The playback module 32 is further configured to switch, in the three-dimensional space of extended reality, the first short video to the second short video for playback according to the second video element data and three-dimensional spatial positions corresponding respectively to the respective elements.

In a specific application scenario, the playback module 32 is further specifically configured to, by adjusting the three-dimensional spatial positions corresponding respectively to the elements in the second video element data, dynamically move the elements to target spatial positions, so as to realize the switching of the first short video to the second short video for playback in a preset form.

In a specific application scenario, optionally, the preset form includes: scrolling switching, or overlaying display, or replacement display.

In a specific application scenario, optionally, the interactive area element includes: a video author avatar element; the playback area element includes: a user name element.

Correspondingly, the playback module 32 is further specifically configured to, after playing, in a three-dimensional space of extended reality, the first short video according to the first video element data and the three-dimensional spatial positions corresponding respectively to the respective elements, in response to a select instruction of the video author avatar element or the user name element, obtain video author page data of the first short video; determine three-dimensional spatial positions of page elements corresponding to the video author page data; display, in the three-dimensional space of extended reality, a video author page of the first short video according to the video author page data and the three-dimensional spatial positions of the corresponding page elements.

In a specific application scenario, the playback module 32 is further specifically configured to display the video author page of the first short video while playing the first short video.

In a specific application scenario, optionally, the video author page data includes at least one video cover element, wherein the video cover elements can be displayed by scroll switching, by adjusting their respective corresponding three-dimensional spatial positions.

In a specific application scenario, the obtaining module 31 is further configured to, after displaying, in the three-dimensional space of extended reality, a video author page of the first short video according to the video author page data and the three-dimensional spatial positions of the corresponding page elements, in response to a select-for-playback instruction of the video cover element, obtain third video element data of a third short video, wherein the third short video is a short video corresponding to the video cover element selected for playback, and the third video element data includes: a playback area element and an interactive area element of the third short video.

The playback module 32 is further configured to switch, in the three-dimensional space of extended reality, the first short video to the third short video for playback according to the third video element data and the three-dimensional spatial positions corresponding to the respective elements.

In a specific application scenario, optionally, the interactive area element includes: a comment button element.

Correspondingly, the obtaining module 31 is further configured to, after playing, in a three-dimensional space of extended reality, the first short video according to the first video element data and the three-dimensional spatial positions corresponding respectively to the respective elements, in response to a select instruction of the comment button element, obtain video comment page data of the first short video.

The playback module 32 is further configured to determine three-dimensional spatial positions of page elements corresponding to the video comment page data; display, in the three-dimensional space of extended reality, a video comment page of the first short video according to the video comment page data and the three-dimensional spatial positions of the corresponding page elements.

In a specific application scenario, the playback module 32 is further specifically configured to display the video comment page of the first short video while playing the first short video.

In a specific application scenario, optionally, the video comment page data includes: at least one comment information element, wherein the comment information elements can be displayed by scrolling switching in a predetermined direction by adjusting their respective corresponding three-dimensional spatial positions.

In a specific application scenario, optionally, the interactive area element includes: a comment number element.

Correspondingly, the obtaining module 31 is further configured to, after displaying, in the three-dimensional space of extended reality, a video comment page of the first short video according to the video comment page data and the three-dimensional spatial positions of the corresponding page elements, in response to a comment submit instruction, obtain the number of comments on the first short video.

The playback module 32 is further configured to, by accumulating the number of comments, update and display the comment number element.

In a specific application scenario, optionally, the interactive area element includes: a like button element and a like number element.

Correspondingly, the obtaining module 31 is further configured to, after playing, in a three-dimensional space of extended reality, the first short video according to the first video element data and the three-dimensional spatial positions corresponding respectively to the respective elements, in response to a select instruction of the like button element, obtain the number of likes for the first short video.

The playback module 32 is further configured to, by accumulating the number of likes, update and display the like number element, and change a display status of the like button element.

In a specific application scenario, the playback module 32 is further specifically configured to, while playing the first short video, update and display the like number element, and change the display status of the like button element.

It should be noted that for other corresponding descriptions of the functional units involved in a short video playback apparatus provided in this embodiment, reference can be made to the corresponding descriptions in FIGS. 1 and 2, and will not be repeated here.

Based on the above methods as shown in FIGS. 1 and 2, accordingly, this embodiment also provides a computer-readable storage medium having computer program stored thereon, wherein the computer program, when executed by a processor, implements the short video playback methods as shown in FIGS. 1 and 2.

Based on such understanding, the technical solution of the present disclosure may be embodied in the form of a software product, which may be stored on a non-volatile storage medium (which may be a CD-ROM, a USB flash drive, a removable hard disk, or the like), and includes a number of instructions for enabling a computer device (which may be a personal computer, a server, or a network device, etc.) to execute the methods of various implementation scenarios of the present disclosure.

Based on the above methods as shown in FIGS. 1 and 2, and the virtual apparatus embodiment shown in FIG. 8, in order to achieve the above objective, an embodiment of the present disclosure further provides an electronic device, which may be specifically an extended reality device, a tablet computer, a smart phone or other network device, etc., the device comprising a storage medium and a processor; wherein the storage medium is configured to store a computer program; and the processor is configured to execute a computer program to implement the above short video playback methods as shown in FIGS. 1 and 2.

Optionally, the physical device described above may also comprise a user interface, a network interface, a camera, a radio frequency (RF) circuit, a sensor, an audio circuit, a WI-FI module, etc. The user interface may include a display screen (Display), an input unit such as a keyboard, etc., and optionally, the user interface may also include a USB interface, a card reader interface, etc. The network interface may optionally include a standard wired interface, a wireless interface (such as a WI-FI interface), etc.

Those skilled in the art will appreciate that the above-mentioned physical device structure provided in this embodiment does not constitute a limitation on the physical device, and may include more or fewer components, or a combination of certain components, or different arrangements of components.

The storage medium may also include an operating system and a network communication module. The operating system is a program that manages the hardware and software resources of the above-mentioned physical device and supports the operation of an information processing program and other software and/or programs. The network communication module is used to carry out communication between components inside the storage medium, and communication with other hardware and software in the physical information processing device.

Through the description of the above implementation modes, those skilled in the art can clearly understand that the present disclosure can be implemented by means of software plus a necessary general hardware platform, or can be implemented by hardware. By applying this embodiment, using the existing capabilities of the extended reality device, a spatial scheme for watching short videos and related interactions in three dimensions of X, Y, and Z axes is made, and a standard for how to place and interact with the elements in the VR space is established. The content and format of short video social software at the smartphone end may be displayed in the extended reality space. The entire space may be roughly divided into areas such as content, interaction, personal homepage panel, and comment panel. The content and interactive areas are compatible with different video sizes, providing a unified interaction experience. The content, personal homepage, and comment panel create, using the spatial relationship, a watching experience that is completely different from that at the mobile phone end, which can provide an immersive sense of space for the user when watching short videos, thereby providing the user with a better watching experience.

It should be noted that, in this document, relational terms such as "first" and "second" are merely used to distinguish one entity or operation from another entity or operation, and do not necessarily require or imply any actual relationship or order between these entities or operations. Furthermore, the terms "comprises," "comprising," or any other variations thereof, are intended to cover a non-exclusive inclusion, such that a process, method, article, or apparatus that includes a list of elements includes not only those elements but also other elements not expressly listed, or also includes elements inherent to such process, method, article, or apparatus. Without further limitation, an element defined by the phrase "comprising a . . . " does not exclude the presence of other identical elements in the process, method, article, or apparatus that includes the element.

The above description is only a specific embodiment of the present disclosure, so that those skilled in the art can understand or implement the present disclosure. Various modifications to these embodiments will be readily apparent to those skilled in the art, and the generic principles defined herein may be implemented in other embodiments without departing from the spirit or scope of the disclosure. Thus, the present disclosure will not be limited to the embodiments described herein but is to be accorded the widest scope consistent with the principles and novel features disclosed herein.

What is claimed is:

1. A video playback method, applied to an extended reality device end, comprising:

presenting an extended reality space, and obtaining a user's instruction to open a first video;

obtaining first video element data of the first video, wherein the first video element data comprises: a playback area element and an interactive area element of the first video;

displaying the playback area element and the interactive area element at different area positions of the extended reality space;

wherein the playback area element and the interactive area element each has spatial positions having three dimensions; and wherein the displaying the playback area element and the interactive area element at different area positions of the extended reality space comprises:

determining three-dimensional spatial positions corresponding respectively to different elements in the first video element data by configuring, in advance, at least one of a corresponding mapping relationship via which the three-dimensional spatial positions corresponding to the different elements is determined before playback, or priority of the different elements.

2. The method according to claim 1, wherein the different area positions comprise: non-overlapping areas of the same plane of the extended reality space, or different planes of the extended reality space.

3. The method according to claim 2, wherein the displaying the playback area element and the interactive area element at different area positions of the extended reality space comprises:

playing, in a three-dimensional space of extended reality, the first video according to the first video element data and the three-dimensional spatial positions corresponding respectively to the respective elements.

4. The method according to claim 3, wherein the playing, in the three-dimensional space of extended reality, the first video according to the first video element data and the three-dimensional spatial positions corresponding respectively to the respective elements specifically comprises:

configuring the respective elements in the first video element data at their corresponding three-dimensional spatial positions respectively to play the first video.

5. The method according to claim 3, wherein after the playing, in a three-dimensional space of extended reality, the first video according to the first video element data and the three-dimensional spatial positions corresponding respectively to the respective elements, the method further comprises:

in response to a video switching instruction, obtaining second video element data of a second video, wherein the second video element data comprises: a playback area element and an interactive area element of the second video;

switching, in the three-dimensional space of extended reality, the first video to the second video for playback according to the second video element data and three-dimensional spatial positions corresponding respectively to the respective elements.

6. The method according to claim 5, wherein the switching, in the three-dimensional space of extended reality, the first video to the second video for playback according to the second video element data and three-dimensional spatial positions corresponding respectively to the respective elements comprises:

by adjusting the three-dimensional spatial positions corresponding respectively to the elements in the second video element data, dynamically moving the elements to target spatial positions, so as to realize the switching of the first video to the second video for playback in a preset form.

7. The method according to claim 6, wherein the preset form comprises: scrolling switching, or overlaying display, or replacement display.

8. The method according to claim 3, wherein the interactive area element comprises: a video author avatar element; the playback area element comprises: a user name element;

after the playing, in a three-dimensional space of extended reality, the first video according to the first video element data and the three-dimensional spatial positions corresponding respectively to the respective elements, the method further comprises:

in response to a select instruction of the video author avatar element or the user name element, obtaining video author page data of the first video;

determining three-dimensional spatial positions of page elements corresponding to the video author page data;

displaying, in the three-dimensional space of extended reality, a video author page of the first video according to the video author page data and the three-dimensional spatial positions of the corresponding page elements.

9. The method according to claim 8, wherein the displaying, in the three-dimensional space of extended reality, a video author page of the first video according to the video author page data and the three-dimensional spatial positions of the corresponding page elements comprises:

displaying the video author page of the first video while playing the first video.

10. The method according to claim 8, wherein the video author page data comprises at least one video cover element, wherein the video cover elements can be displayed by scroll switching, by adjusting their respective corresponding three-dimensional spatial positions.

11. The method according to claim 10, wherein after the displaying, in the three-dimensional space of extended reality, a video author page of the first video according to the video author page data and the three-dimensional spatial positions of the corresponding page elements, the method further comprises:

in response to a select-for-playback instruction of the video cover element, obtaining third video element data of a third video, wherein the third video is a video corresponding to the video cover element selected for playback, and the third video element data comprises: a playback area element and an interactive area element of the third video;

switching, in the three-dimensional space of extended reality, the first video to the third video for playback according to the third video element data and the three-dimensional spatial positions corresponding to the respective elements.

12. The method according to claim 3, wherein the interactive area element comprises: a comment button element;

after the playing, in a three-dimensional space of extended reality, the first video according to the first video element data and the three-dimensional spatial positions corresponding respectively to the respective elements, the method further comprises:

in response to a select instruction of the comment button element, obtaining video comment page data of the first video;

determining three-dimensional spatial positions of page elements corresponding to the video comment page data;

displaying, in the three-dimensional space of extended reality, a video comment page of the first video according to the video comment page data and the three-dimensional spatial positions of the corresponding page elements.

13. The method according to claim 12, wherein the displaying, in the three-dimensional space of extended reality, a video comment page of the first video according to the video comment page data and the three-dimensional spatial positions of the corresponding page elements comprises:

displaying the video comment page of the first video while playing the first video.

14. The method according to claim 12, wherein the video comment page data comprises: at least one comment information element, wherein the comment information elements can be displayed by scrolling switching in a predetermined direction by adjusting their respective corresponding three-dimensional spatial positions.

15. The method according to claim 12, wherein the interactive area element comprises: a comment number element;

after the displaying, in the three-dimensional space of extended reality, a video comment page of the first video according to the video comment page data and the three-dimensional spatial positions of the corresponding page elements, the method further comprises:

in response to a comment submit instruction, obtaining the number of comments on the first video;

by accumulating the number of comments, updating and displaying the comment number element.

16. The method according to claim 3, wherein the interactive area element comprises: a like button element and a like number element;

after the playing, in a three-dimensional space of extended reality, the first video according to the first video element data and the three-dimensional spatial positions corresponding respectively to the respective elements, the method further comprises:

in response to a select instruction of the like button element, obtaining the number of likes for the first video;

by accumulating the number of likes, updating and displaying the like number element, and changing a display status of the like button element.

17. The method according to claim 16, wherein by accumulating the number of likes, the updating and displaying the like number element, and changing a display status of the like button element comprises:

while playing the first video, updating and displaying the like number element, and changing the display status of the like button element.

18. A non-transitory computer-readable storage medium having computer program stored thereon, the computer program, when executed by a processor, implements a video playback method, applied to an extended reality device end, comprising:

presenting an extended reality space, and obtaining a user's instruction to open a first video;

obtaining first video element data of the first video, wherein the first video element data comprises: a playback area element and an interactive area element of the first video;

displaying the playback area element and the interactive area element at different area positions of the extended reality space;

wherein the playback area element and the interactive area element each has spatial positions having three dimensions; and wherein the displaying the playback area element and the interactive area element at different area positions of the extended reality space comprises:

determining three-dimensional spatial positions corresponding respectively to different elements in the first video element data by configuring, in advance, at least one of a corresponding mapping relationship via which the three-dimensional spatial positions corresponding to the different elements is determined before playback, or priority of the different elements.

19. An electronic device, comprising a storage medium, a processor, and a computer program stored on the storage medium and executable on the processor, the processor, when executing the computer program, implements a video playback method, applied to an extended reality device end, comprising:

presenting an extended reality space, and obtaining a user's instruction to open a first video;

obtaining first video element data of the first video, wherein the first video element data comprises: a playback area element and an interactive area element of the first video;

displaying the playback area element and the interactive area element at different area positions of the extended reality space;

wherein the playback area element and the interactive area element each has spatial positions having three dimensions; and wherein the displaying the playback area element and the interactive area element at different area positions of the extended reality space comprises:

determining three-dimensional spatial positions corresponding respectively to different elements in the first video element data by configuring, in advance, at least one of a corresponding mapping relationship via which the three-dimensional spatial positions corresponding to the different elements is determined before playback, or priority of the different elements.

20. The electronic device according to claim 19, wherein the different area positions comprise: non-overlapping areas of the same plane of the extended reality space, or different planes of the extended reality space.

* * * * *